April 25, 1933.  C. T. BUFF  1,905,993
TREATMENT OF GASES
Filed Aug. 26, 1931
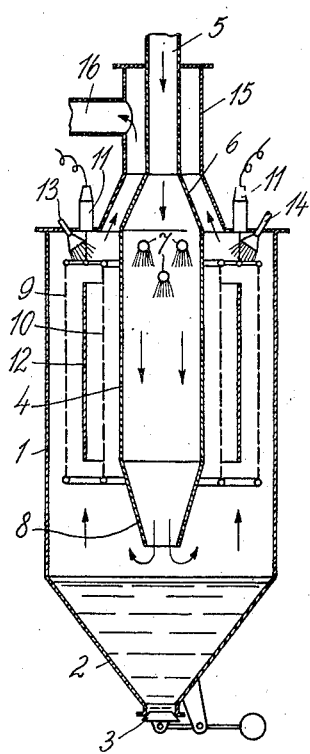
Inventor
Carl Theodor Buff
by Knight Bros
attorneys Patented Apr. 25, 1933

1,905,993

UNITED STATES PATENT OFFICE

CARL THEODOR BUFF, OF BERLIN-SPANDAU, GERMANY, ASSIGNOR, BY MESNE ASSIGN-
MENTS, TO INTERNATIONAL PRECIPITATION COMPANY, OF LOS ANGELES, CALI-
FORNIA, A CORPORATION OF CALIFORNIA

TREATMENT OF GASES

Application filed August 26, 1931, Serial No. 559,453, and in Germany August 29, 1930.

My invention relates to the treatment of gases and more particularly to a device for the cooling and preliminary cleaning of gases, especially blast furnace gases, to be cleaned mainly by electrical means.

Some gases, and particularly blast furnace gases, are, before being passed through the gas-cleaning apparatus, subjected to a preliminary treatment consisting in their being cooled and partly freed from a part of the dust suspended in them. This is specially advantageous when the gas-cleaning plant is of the wet type and an electrical precipitator is used. Devices of that kind for cooling and preliminary cleaning are often so designed as to consist of a cooling vessel into which the gases are passed through a pipe preferably provided with moistening devices and extending into said vessel. The gases cooled by the moistening are discharged from the pipe, which is advantageously made to taper towards the bottom, at a great velocity onto the liquid at the bottom of the vessel and thereby throw out of the gas current the greater part of the water droplets they contain. The gas distributes itself over the outwardly lying area of the cooler and flows upwards at a lesser velocity, so that only a smaller number of water droplets are entrained by the gas current. In the following the improvement of a device of that kind will be described.

According to my invention, discharge electrodes are arranged in the annular space surrounding the inlet pipe, said discharge electrodes being in the known manner fed with high-voltage direct current. Through the electric field, the water particles which may still be carried by the gases and a further part of the dust suspended in same are precipitated. Instead of a single discharge electrode, a plurality of annular discharge and collecting electrodes may, under circumstances, be arranged in the upper part of the annular space surrounding the inlet pipe. The precipitating effect is thereby increased. It is further of advantage to provide trickling devices in the annular space, and, under circumstances also for the electrodes, in order by this means to prevent the accumulation of dust on the inside of the walls of the cooling vessel or on the electrodes. The section of the cooling device may, of course, be made of any desired shape and may, for example, also have a rectangular form.

To carry away efficiently the gases from the cooling device, a plurality of discharge pipes for the pre-treated gases may be provided at the top of the device.

A particularly advantageous arrangement is to provide only one discharge pipe which surrounds the inlet pipe concentrically and is preferably somewhat contracted. The advantage obtained thereby is that the cooled gas on leaving the cooling device comes into contact with the hot surface of the concentrical gas inlet pipe. The gases are hereby in some degree re-heated and any remaining water particles or dampness are evaporated. The contraction of the discharge pipe also produces through the throttling of the gases so caused a good distribution of the latter.

An example for carrying out my invention is illustrated in the accompanying drawing. 1 is a vessel serving as a cooling device and having a funnel-shaped floor 2, the opening at the bottom of which is closed by the valve 3. The funnel-shaped bottom 2 of the vessel is for the greater part filled with water. A gas inlet 4 of suitable length projects from the top into the cooling vessel 1. The raw gases coming from the gas producer are introduced into the pipe 4 through the pipe 5. The pipe 4 has a considerably larger diameter than the gas delivering pipe 5, with which it is connected through a conical intermediate part 6. In the interior of the pipe 4 a number of injecting nozzles 7 are fitted, which moisten well the gases flowing past and cool them at the same time. At the bottom end of the pipe 4 is the conical or tapering part 8, which reduces the area of flow of the gas current passing through it and causes the gases to increase their velocity. The current of gases leaving the conical part 8 at a great velocity is hurled against the surface of the liquid contained in the funnel 2, so that a great part of the moistened dust contained in the raw gas and a part of the water droplets is thrown out of the gas current and precipitated. The gas current now spreads in the annular space surrounding the central pipe 4 and moves upwards in that space. In this annular space are arranged the two annular discharge electrodes 9 and 10, preferably fixed to a common supporting frame, carried by a number of insulators 11. Between the two annular discharge electrodes 9 and 10 is suspended the collecting electrode 12.

Electric discharge fields are set up between the discharge electrodes on the one hand and the collecting electrodes 12, the inner surface of the cooling vessel 1 and the outer surface of the pipe 4 on the other hand, and the gas current rising in the annular space passes through these discharge fields. The gas current is thereby freed from the water particles it still contained and from a further part of the dust suspended in the raw gas. Above the discharge electrodes are arranged injecting nozzles 13 and 14 which periodically wash the collecting and the discharge electrodes with liquid, so that they are thus kept clean. For this purpose, the high tension current supplied to the discharge electrodes is interrupted for short periods of time at periodic intervals while the nozzles 13 and 14 are active so that short circuiting of the electric current between the discharge and collecting electrodes, is avoided. The gas current pre-treated in the described manner is now discharged through the discharge pipe 15, which surrounds concentrically the inlet pipe 5 and is slightly contracted towards the top, from the cooling device and conveyed through the pipe 16 to the gas-cleaning apparatus, to be purified from the remaining impurities.

I claim as my invention:

1. A device for the cooling and preliminary cleaning of gases to be cleaned mainly by electrical means, consisting of a cooling vessel, an inlet pipe for gases projecting into and forming an annular space between it and the wall of said vessel, moistening devices in said inlet pipe, said vessel being provided with a discharge outlet for gases leading from the upper end of said annular space, and discharge electrodes in the annular space surrounding said inlet pipe, said discharge electrodes being adapted for connection with a high-voltage source of electricity.

2. A device for the cooling and preliminary cleaning of gases to be cleaned mainly by electrical means, consisting of a cooling vessel, an inlet pipe for gases projecting into said vessel and forming an annular space between it and the wall of said vessel, moistening devices arranged in said inlet pipe, a plurality of high-voltage discharging electrodes arranged in said annular space and concentrically with respect to said inlet pipe, and a collecting electrode disposed between and concentrically arranged with respect to said discharge electrodes, said cooling vessel being provided with a discharge outlet leading from the upper end of said annular space.

3. A device for the cooling and preliminary cleaning of gases to be cleaned mainly by electrical means, consisting of a cooling vessel, an inlet pipe for gases projecting into said vessel, said inlet pipe and the wall of said vessel forming an annular space between them, moistening devices for the gases passing through said inlet pipe, discharge electrodes arranged in said annular space and adapted to be connected up to a high-voltage source of electricity, and trickling devices disposed in said annular space for washing dust from the dust-collecting surfaces, said cooling vessel being provided with a discharge outlet leading from the upper end of said annular space.

4. A device for the cooling and preliminary cleaning of gases to be cleaned mainly by electrical means, consisting of a cooling vessel, an inlet pipe for gases projecting into said vessel and forming with the wall of the cooling vessel an annular space, moistening devices arranged in said inlet pipe, a discharge pipe for the gases connected to the top of said vessel, and discharge electrodes arranged in said annular space around said inlet pipe and adapted to be connected to a high-voltage source, said vessel being provided with outlet connections leading from said annular space at the top for preliminarily treated gases.

In testimony whereof I affix my signature.

CARL THEODOR BUFF.